US009086679B2

(12) United States Patent
Lee

(10) Patent No.: US 9,086,679 B2
(45) Date of Patent: Jul. 21, 2015

(54) IMAGE FORMING APPARATUS INCLUDING CONSUMABLE UNIT AND METHOD OF CONTROLLING POWER SUPPLY THEREOF

(75) Inventor: Jae-yoon Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 684 days.

(21) Appl. No.: 13/233,205

(22) Filed: Sep. 15, 2011

(65) Prior Publication Data

US 2012/0062950 A1 Mar. 15, 2012

(30) Foreign Application Priority Data

Sep. 15, 2010 (KR) ............................ 2010-0090402
Mar. 7, 2011 (KR) ............................ 2011-0019969

(51) Int. Cl.
*G06F 3/12* (2006.01)
*G03G 21/18* (2006.01)
*G03G 15/08* (2006.01)

(52) U.S. Cl.
CPC ........ *G03G 21/1878* (2013.01); *G03G 15/0863* (2013.01); *G03G 2215/0697* (2013.01); *G03G 2221/1823* (2013.01)

(58) Field of Classification Search
None
See application file for complete search history.

(56) References Cited

U.S. PATENT DOCUMENTS 5,802,420 A 9/1998 Garr et al.
6,019,461 A * 2/2000 Yoshimura et al. ............ 347/86
6,173,128 B1 * 1/2001 Saber et al. .................... 399/24
6,295,423 B1 * 9/2001 Haines et al. .................. 399/24
6,409,401 B1 * 6/2002 Petteruti et al. ................ 400/88
6,459,860 B1 * 10/2002 Childers ........................ 399/12
6,497,469 B1 * 12/2002 Shinada et al. ................ 347/19
8,135,291 B2 * 3/2012 Chihara ......................... 399/24
8,345,282 B2 * 1/2013 Nishimi et al. .............. 358/1.15
8,375,401 B2 * 2/2013 Yasui ........................... 719/321
8,549,190 B2 * 10/2013 Komano et al. ................ 710/18
8,582,989 B2 * 11/2013 Suda ............................. 399/27
2001/0017635 A1 * 8/2001 Kan et al. ...................... 347/22
2002/0073148 A1 * 6/2002 Haines et al. ................ 709/204
2002/0118243 A1 * 8/2002 Forman ......................... 347/19
2005/0286913 A1 12/2005 Adkins et al.
2007/0047974 A1 * 3/2007 Tanaka ............................ 399/8
2009/0033974 A1 * 2/2009 Nishimi et al. .............. 358/1.14
2009/0034994 A1 * 2/2009 Chihara ......................... 399/24
2010/0020350 A1 * 1/2010 Lee et al. ..................... 358/1.15
2010/0115536 A1 * 5/2010 Yasui ........................... 719/327
2012/0062950 A1 * 3/2012 Lee ............................. 358/1.15

FOREIGN PATENT DOCUMENTS

CN 1199185 11/1998
EP 1238810 A2 9/2002
JP 3999458 8/2007

OTHER PUBLICATIONS

Chinese Office Action issued Jan. 23, 2015 in Chinese Patent Application No. 201110273001.X.

* cited by examiner

*Primary Examiner* — Marcus T Riley
(74) *Attorney, Agent, or Firm* — Staas & Halsey LLP

(57) ABSTRACT

An image forming apparatus includes a consumable unit with a built-in memory, a power supply unit to provide power to drive the memory, and a control unit to control the power supply unit to provide power to the memory and to access the memory, when an event that needs to access the memory happens, and to control the power supply unit to cut off the power to the memory, when a process with respect to the memory is finished.

31 Claims, 9 Drawing Sheets

IMAGE FORMING APPARATUS INCLUDING CONSUMABLE UNIT AND METHOD OF CONTROLLING POWER SUPPLY THEREOF

CROSS-REFERENCE TO RELATED APPLICATIONS

This application claims priority under 35 U.S.C. §119(a) from Korean Patent Application No. 10-2010-0090402 filed on Sep. 15, 2010 and Korean Patent Application No. 10-2011-0019969 filed on Mar. 7, 2011 in the Korean Intellectual Property Office, the contents of which are incorporated herein by reference in their entirety.

BACKGROUND OF THE INVENTION

1. Field of the Invention

The present general inventive concept relates to an image forming apparatus having a consumable unit and a method of controlling power supply thereof, and more particularly, to an image forming apparatus to control power supply provided to the consumable unit with a built-in memory, and a method of controlling power supply thereof.

2. Description of the Related Art

As computers have become widely used, peripheral devices have also become widespread. Typical examples of peripheral devices are image forming apparatuses such as printers, facsimiles, scanners, copy machines, and multifunctional printers.

Image forming apparatuses use ink or toner to print images on paper. Ink or toner is used whenever image performing operations are performed and then may be exhausted after a predetermined period of time. If ink or toner is exhausted, a unit for storing ink or toner needs to be replaced. Such parts or components which are replaceable in the image forming apparatus are referred to as consumable units or replaceable units.

In addition to the above-described units that need to be replaced when whose ink or toner are exhausted, there are one or more units that need to be replaced because of their malfunction, poor performance, low quality, quality change, or inability to maintain the desired performance or quality for a predetermined period of time or even before their lifespan. That is, parts, such as a transferring belt other than a developer unit, may be included in the consumable units.

Specifically, a laser imaging forming apparatus includes a charge unit, a transfer unit, and a fusing unit, and each of the units has various kinds of roller and belt, which may be worn out or degenerated when they are used more than a given lifespan. Accordingly, the quality of image may be deteriorated remarkably. Therefore, a user needs to replace each of component units, that is, consumable units, at every proper time such that printing of an image is well performed.

In order to manage consumable units, each consumable unit is mounted with a memory to exchange information with a main body of the image forming apparatus. The memory stores information, such as a printed page count, a dot count, and expiration, so that a time to replace the consumable unit may be managed. The memory mounted to the consumable unit is referred to as a CRUM memory (Customer Replaceable Unit Monitoring memory) in general, but it may be referred to as a different term.

Meanwhile, a consumable unit mounted with a memory is electrically connected to the image forming apparatus through a contact and is provided with power. A control unit included in the main body of the image forming apparatus may access the consumable unit to perform data reading or writing. Accordingly, power is always provided to the consumable unit, unless the image forming apparatus is power off.

However, there has been a problem that power supply is not efficient, because data reading or data writing by accessing the consumable unit can be performed in a very short time, compared to a period of time for power being provided.

In addition, the consumable unit is easily detached from or attached to the main body of the image forming apparatus. Accordingly, in a case that a user tries to detach the consumable unit while the consumable unit is included in the main body and is being provided with power, it causes a problem to the image forming apparatus or the consumable unit.

SUMMARY OF THE INVENTION

The general inventive concept provides an image forming apparatus to provide one or more consumable units with power supply effectively and safely, and a method of providing power supply thereof and controlling the consumable units.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus including a consumable unit with a built-in memory, a power supply unit electrically connected to the consumable unit to provide a power supply to the consumable unit to drive the memory, a memory control unit to determine whether an event that needs to access the memory happens, a power management unit to control the power supply unit to provide power to the memory when the event happens, a movable cover through which the consumable unit is detachable from a main body of the image forming apparatus, a determination unit to determine whether the cover is opened, an output unit to output an error message, when the cover is determined to be opened while power is being provided to the memory, and an Input/Output (I/O) control unit to perform at least one operation of data reading and data writing with respect to the memory under the control of the memory control unit, when the cover is determined to be closed while power is being provided to the memory.

The consumable unit may include a plurality of the consumable units. When an operation with respect to a memory mounted on one of a plurality of the consumable units is finished, the memory control unit determines whether there exists other memory to access. When it is determined that there exists other memory to access, the determination unit may determine a cover corresponding to the consumable unit on which the other memory is mounted is opened. The power supply control unit may control the power supply unit to cut off the power supply, when there exists no additional memory to access.

The foregoing and/or other aspects and utilities of the present general inventive concept may also be achieved by providing a method of providing a power supply of an image forming apparatus using a consumable unit having a memory which data is stored thereto. The method may include determining whether an event that needs to access the memory happens, providing power supply to the memory when it is determined that the event happened, determining a cover movably attached to a main body of the image forming apparatus is opened to detach the consumable unit from the image forming apparatus, displaying an error message when the cover is opened, and performing at least one operation of data reading and writing by accessing the memory when the cover is closed, determining whether there exists other memory to access, when there exist other memory to access, determining whether the cover corresponding to the consumable unit having the other memory is opened, and when there is no other memory to access, cutting off the power supply.

The foregoing and/or other aspects and utilities of the present general inventive concept may also be achieved by providing an image forming apparatus including a consumable unit with a built-in memory, a power supply unit to provide power to drive the memory, and a control unit, when an event that needs to access the memory happens, to control the power supply unit to provide power to the memory, to access the memory, and when an operation in respect to the memory has finished, to control the power supply unit to shut power to the memory.

The image forming apparatus may further include a determination unit to determine whether the consumable unit is detachable and an output unit to output an error message when the consumable unit is determined to be detachable while the memory is being provided with power.

The control unit may include an I/O control unit to perform a read/write operation on the memory, a power control unit to control the power supply unit, a memory control unit to control the I/O control unit and the power control unit to manage the memory, and a main control unit to control general operations of the image forming apparatus.

The image forming apparatus may further include the determination unit to determine whether the consumable unit is detachable. In this case, the control unit may control the power supply unit to cut off the power provided to the memory, when the consumable unit is determined to be in a detachable state while power is being provided to the memory. The control unit may control the power supply unit not to provide power to the memory when the event happens and when the consumable unit is under a detachable state. When the consumable unit includes a plurality of consumable units, if it is determined that one of the plurality of the consumable units becomes detachable while power is being provided to the consumable unit, the control unit may control the power supply unit to cut off the power after a process with respect to the one consumable unit is finished.

The determination unit senses whether a cover attached to a main body of the image forming apparatus is opened, when the cover is opened, the consumable unit may be determined to be detachable, and when the cover is closed, the consumable unit may be determined to be non-detachable.

The consumable unit may include a plurality of the consumable unit, and the control unit may control the determination unit to sequentially determine whether each of the plurality of the consumable units is detachable.

The event may be at least one of events that a mode of operating the image forming apparatus is changed, the image forming apparatus is changed between a turn-on state and a turn-off state, a cover attached to the main body of the image forming apparatus is changed between a closed state and an open state, and executing an image forming job is finished.

The I/O control unit may output an I/O signal clock to the consumable unit to sequentially access the plurality of the consumable unit, and the power supply control unit may control the power supply unit to provide power to all of the consumable units to access until outputting I/O signal clocks to all of the consumable units to access is completed.

The power supply unit may include a plurality of power supply units to access the plurality of the consumable units, respectively, the I/O control unit may output an output I/O signal clock to the consumable unit to sequentially access the plurality of the consumable unit, and the power supply control unit may control the plurality of power supply units to provide power to the consumable unit to access during an operation of outputting an I/O signal clock to each of the consumable units to sequentially access.

The consumable unit may include a CRUM unit (Customer Replaceable Unit Monitoring memory) having a CPU (Central Processing Unit) coupled to the memory, the control unit may control the power supply unit to provide power to the CRUM unit when the event happens, transmit a clock signal and a data to the CRUM unit after a first delay time passed, stop transmitting the clock signal and the data when the process in respect to the CRUM unit has finished, and control to cut off power supply to the CRUM unit after a predetermined second delay time passed.

The foregoing and/or other aspects and utilities of the present general inventive concept may also be achieved by providing a method of providing power of an image forming apparatus using a consumable unit with a built-in memory, the method including providing power to the memory when an even that needs to access the memory happens, performing at least one operation of data reading and data writing by accessing the memory, and cutting off the power supply provided to the memory, when the operation is finished.

The method may further include determining whether the consumable unit is detachable while power is being provided to the memory and outputting an error message when the consumable unit is determined to be detachable.

The method may further include determining whether the consumable unit is detachable while power is being provided to the memory and cutting off the power supply when the consumable unit is determined to be non-detachable.

The method may further include determining whether the consumable unit is detachable. When the consumable unit includes a plurality of consumable units, even though one of the plurality of the consumable units is determined to be detachable while the power is being provided to the one of the plurality of the consumable units and the memory is being accessed, the power may be cut off after the process with respect to the one consumable unit is finished.

The detachable state may represent a state that the cover attached to the main body of the image forming apparatus is opened.

The providing a power supply, performing an operation, and cutting off power supply may be sequentially performed with respect to the plurality of the consumable units.

The event may be at least one of events that a mode of operating the image forming apparatus is changed, the image forming apparatus is in one of a turn-on state and a turn-off state, a cover attached to the main body of the image forming apparatus is in a closed state and an open state, and executing an image forming job is finished.

The consumable unit may include a CRUM unit having a CPU coupled to the memory. The operation may be performed by transmitting clock signal and data to the CRUM unit after a first delay time from when power has been provided to the CRUM unit. When the operation finishes, the transmitting the clock signal and the data stops and the power provided to the CRUM is cut off after a predetermined second delay time.

The foregoing and/or other aspects and utilities of the present general inventive concept may also be achieved by providing a consumable unit useable with an image forming apparatus, the consumable unit including a housing to contain a consumable element, and a memory formed on the housing to store information on the consumable element and to selectively receive a power supply from the image forming apparatus when being installed in the image forming apparatus.

The memory may not receive the power supply during a non-data communication with the image forming apparatus.

The memory may not receive the power supply according to a state of the housing which is associated with a state of a cover of the image forming apparatus.

The memory may include a first terminal to receive the power supply and a second terminal to receive data from the image forming apparatus, and the memory may receive the power supply through the first terminal a first predetermined time before a data communication through the second terminal and may not receive the power supply through the first terminal a second predetermined time after the data communication through the second terminal.

The foregoing and/or other aspects and utilities of the present general inventive concept may also be achieved by providing an image forming apparatus including a consumable unit having a housing to contain a consumable element, and a memory formed on the housing to store information on the consumable element, and a main body installed with the consumable unit to selectively provide a power supply to the consumable unit when being installed in the image forming apparatus to reduce a power consumption.

The main body may cut off the power supply to the consumable unit during a non-data communication.

The main body may cut off the power supply to the consumable unit according to a state of the consumable unit which is associated with a state of a cover of the image forming apparatus.

The memory may include a first terminal to receive the power supply and a second terminal to receive data from the image forming apparatus, and the main body may provide the power supply through the first terminal a first predetermined time before a data communication through the second terminal, provide the power supply through the first terminal a second predetermined time after the data communication through the second terminal the control unit, and cut off the power supply to the consumable unit during a non-data communication between the data communication and a next data communication.

The main body may not constantly provide the power supply to the consumable unit but intermittently provide the power supply according to a determination on a state of the consumable unit which is associated with a state of the main body.

The main body may repeat an operation of providing the power supply and cutting off the power supply according to a state of the main body which is associated with the consumable unit.

The consumable unit may include a plurality of consumable units, and the main body may control the selective power supply according to priorities of the consumable units.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
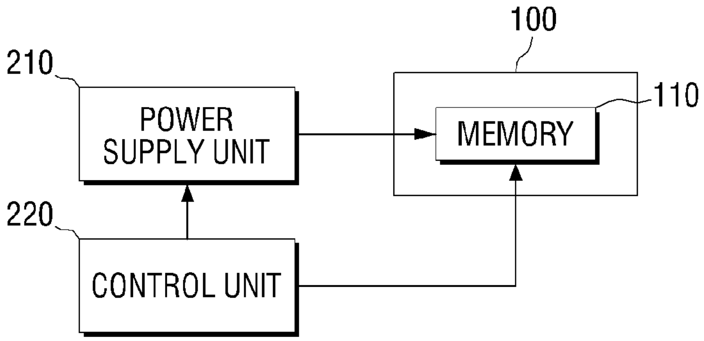
FIG. 1 is a block diagram illustrating the structure of an image forming apparatus according to an exemplary embodiment of the present inventive concept.

Reference will now be made in detail to the embodiments of the present general inventive concept, examples of which are illustrated in the accompanying drawings, wherein like reference numerals refer to the like elements throughout. The embodiments are described below sequentially to explain the present general inventive concept by referring to the figures.

FIG. 1 is a block diagram illustrating a structure of an image forming apparatus according to an exemplary embodiment of the present inventive concept. Referring to FIG. 1, the image forming apparatus includes a consumable unit 100, a power supply unit 210, and a control unit 220. The image forming apparatus may be printers, scanners, multifunctional printers, facsimiles, and copy machines. The consumable unit 100 represents a unit having a memory. The memory may be mounted on a housing of the consumable unit 100. The memory may be a built-in memory 110.

It is possible that the memory may be disposed in an inside portion of the housing of the consumable unit 100. In this case, the consumable unit 100 may have one or more terminals and one or more conductive lines extended from the inside portion of the housing to an outside portion of the housing to connect the terminals and the memory, and the terminals of the housing is connected to one or more electrical terminals of the body of the image forming apparatus.

As described above, the memory 110 may store information or programs of the consumable unit 100 or the memory 110 regarding operations or functions to be performed therein or to be used in the image forming apparatus. The information may be unique information used in the consumable unit 100 to be mounted in the image forming apparatus, and may be information regarding status, for example, a state of use of the consumable units 100 in the corresponding image forming apparatuses.

The programs may include not only general applications, but also an O/S (Operating System) programs and encrypt programs, and the unique information may include information regarding a manufacturer name and/or location, a time of manufacturing the consumable unit, a serial number, a model, an electronic signature, an encrypt key, and an encrypt key index. The information regarding consumables, such as toner or developer, may include information regarding the number of sheets printed using the consumables up to date, the remaining printable capacity, and the amount of the remaining toner or developer. For example, the memory 110 may store information as in the following Table 1.

TABLE 1

| | |
|---|---|
| General Information | |
| OS Version | CLP300_V1.30.12.35 Feb. 22, 2007 |
| SPL-C Version | 5.24 Jun. 28, 2006 |
| Engine Version | 6.01.00(55) |
| USB Serial Number | BH45BAIP914466B. |
| Set Model | DOM |
| Service Start Date | Sep. 09, 2007 |
| Option | |
| RAM Size | 32 Mbytes |
| EEPROM Size | 4096 bytes |
| USB Connected (High) | |
| Consumables Life | |
| Total Page Count | 774/93 Pages(Color/mono) |
| Fuser Life | 1636 Pages |
| Transfer Roller Life | 864 Pages |
| Trayl Roller Life | 867 Pages |
| Total Image Count | 3251 Images |
| Imaging Unit/Deve Roller Life | 61 Images/19 Pages |
| Transfer Belt Life | 3251 Images |
| Toner Image Count | 14/9/14/19 Images(C/M/Y/K) |
| Toner Information | |
| Toner Remains Percent | 99%/91%/92%/100% (C/M/Y/K) |
| Toner Average Coverage | 5%/53%/31%/3% (C/M/Y/K) |
| Consumables Information | |
| Cyan Toner | SAMSUNG(DOM) |
| Magenta Toner | SAMSUNG(DOM) |
| Yellow Toner | SAMSUNG(DOM) |
| Black Toner | SAMSUNG(DOM) |
| Imaging unit | SAMSUNG(DOM) |
| Color Menu | |
| Custom Color | Manual Adjust(CMYK: 0, 0, 0, 0) |
| Setup Menu | |
| Power Save | 20 Minutes |
| Auto Continue | On |
| Altitude Adj. | Plain |

As illustrated in Table 1, the memory 110 may store not only schematic information regarding a consumable unit, but also diverse information regarding a lifespan of consumables and setup menus to set up a process to properly use the consumable or the consumable unit in the corresponding image forming apparatus.

The consumable unit 100 may further include a processor, for example, a central processing unit CPU capable of managing the memory 110, performing diverse programs stored on the memory 110, and communicating with the main body of the image forming apparatus or a controller of other apparatus.

The processor and memory may be formed in a single semiconductor memory chip device. The single semiconductor chip device may be a non-volatile memory, flash memory or solid state device SSD, for example.

As described above, the consumable unit 100 may be related to image forming jobs directly or indirectly. For example, a laser image forming apparatus includes a charging unit, an exposure unit, a developing unit, a transfer unit, a fixing unit, various rollers, a transfer belt, and at least one OPC drum, which a memory is included therein, and the consumable unit 100 may be embodied as other diverse units.

The power supply unit 210 is electrically connected to the consumable unit 100 to provide power to drive the memory 110. In this case, the power supply unit may provide a first power to activate the memory 110 separated from a second power to operate an operation (function) of the consumable unit 100.

The control unit 220 accesses the memory 110 of the consumable unit 100 to perform an operation thereof. The control unit 220 performs a data reading operation of reading data stored on the memory 110 or a data writing operation of writing data thereon.

Meanwhile, a period of time taken to access the memory 110 is relatively short compared to a period of time taken to execute an image forming job (operation). Accordingly, the control unit 220 controls the power supply unit 210 such that the memory 110 may be driven during a period of time corresponding to at least the time taken to access the memory 110. That is, the power supply unit 210 provides power to the memory 110 before a time of starting the access and cut off the power provided to the memory 110 after a time of finishing the access under the control of the control unit 220. Accordingly, the power having been provided to the consumable unit 100 having the memory unit 110 is cut off during a period of time in which the memory 110 or a component of the consumable unit 100 is not used, thereby reducing power consumption.

The control unit 220 may access the memory 110 when an event occurs to access to the memory 110. In detail, the control unit 220 controls to provide power to the memory 110 to access thereto, when at least one event occurs, for example, a mode change event that a mode of operating the image forming apparatus is changed (for example, an event to change from a power save mode to a normal mode), a turn on/off state change event that the image forming apparatus is changed to a turn-on state from a turn-off state, a cover state change event that a cover attached to the main body of the image forming apparatus is change between a closed state and an opening state, a printing operation event that executing an image forming job has finished, and so on. The event may include any event in a communication between the consumable unit 100 and the image forming apparatus to correspond to a function of the image forming apparatus using the consumable unit 100. If there is no more need to access the memory 110 after finishing a process in respect to the memory 110, power supply is cut off.

Meanwhile, the control unit 220 may check or determine whether the consumable unit 100 is detachable from the main body of the image forming apparatus. If the consumable unit 100 is in a detachable state, power supply is cut off or an error message is output such that the consumable unit 100 is prevented from being detached while the power is being provided thereto.

In other words, if an event needs to access the memory 110 and power is being provided to the memory 110, the control unit 220 checks or determines whether the consumable unit 100 is detachable. The detachable state may represent different situations, for example, it may represent a state that a cover attached to the main body of the image forming apparatus is not closed but opened or it may represent states that a paper feeder is opened and a main body case of the image forming apparatus is separated or damaged.

The main body of the image forming apparatus may have an opening formed on a portion of the main body and the cover is detachably attached to the main body to close (cover) or open (expose) the opening. The opening may be disposed to communicate with the consumable unit 100 installed in the main body of the image forming apparatus. When the cover is not fixed to but detached from the main body, the consumable unit 100 may be exposed to an outside through the opening so that the consumable unit is in a detachable state. It is possible that a user can access the consumable unit 100 through the opening. It is also possible that any portion of the main body can communicate with the consumable unit 100 to be in a detachable state or in a non-detachable state according to a state of the portion of the main body. It is also possible that the consumable unit 100 may be in a detachable state when a connection unit of the consumable unit 100 to connect the main body of the image forming apparatus is in a detachable state, which corresponds to the detachable state of the consumable unit 100 according to a movement of the cover.

It is possible that an opening is formed on a housing of the consumable unit 100 to communicate with an inside of the housing and that a cover is movably attached to the housing of the consumable unit 100 to cover (close) or open (expose) the opening of the housing of the consumable unit, In this case it is possible that the cover may form an external appearance of the main body of the image forming apparatus. The cover moves in an open or closed state. According to the open or closed state of the cover, it is determined that the consumable unit 10 is in a non-detachable or detachable state, and then power is supplied to or cut off from the memory of the consumable unit 100.

When it is determined to be detachable, the control unit 220 may perform at least one of a plurality of different processes. For instance, the control unit 220 displays an error message such that a user may not try to detach the consumable unit 100. The error message includes a message to notice that access to the corresponding memory is impossible under the present status, a message to notice that detaching the corresponding consumable unit is not allowed or is not possible for a certain period of time, and a message to advise to shut the cover. Such error messages may be output visually through a display panel or as a voice message through a speaker. The error message may be output as a sound message like alarm sound. However, the present general inventive concept is not limited thereto. The message may be sent to a terminal connected to the image forming apparatus through a wired or wireless communication line. In this case the image forming apparatus may have a unit to perform the wired or wireless communication to output the message to the terminal.

Meanwhile, if a plurality of the consumable units 100 are prepared, the control unit 220 may check or determine whether it is detachable with respect to each of the plurality of the consumable units 100. When one consumable unit was determined to be in a non-detachable state, the cover became opened thereafter, and another consumable unit is determined to be in a detachable state. In this case, the power supply to a memory of the consumable units is cut off and an error message is output. At this state, it is sequentially checked whether the another consumable unit is in a detachable state, and when it is determined that the another consumable unit becomes in a non-detachable state, the power is provided to the another consumable unit to attempt the memory access. Although cutting off power supply and outputting an error message may be executed at the same time, it is possible that one of the processes may be executed. It is possible that the cutting off power supply and the outputting an error message may be sequentially executed.

When at least one of the plurality of the consumable units 100 becomes in a detachable state, the power supply is cut off from all of the plurality of the consumable units 100. When it is determined that all of the plurality of the consumable units 100 are in non-detachable states, power is supplied to all of the plurality of the consumable units 100. Here, power can be separately supplied to each of the consumable units 100. The powers corresponding to the respective consumable units 100 may be different from each other according to characteristics of the consumable units 100. However, it is possible that the powers are same.

When the consumable unit 100 includes a plurality of elements and a single memory corresponding to the plurality of elements, and at least one of the plurality of elements is in a detachable state, the power may be cut off from the memory until all of the plurality of elements are in a non-detachable state. The plurality of elements may be disposed in separate sub-housings, which may be connected to each other, and the memory may be disposed on one of the sub-housings or on a separate sub-housing to store information about the plurality of elements. However, it is possible that the plurality of elements are disposed in a single housing of the consumable unit 100.

The control unit 220 may generate a signal of a message representing that the consumable unit is in a detachable state and/or the cover corresponding to the consumable unit is in one of a closed state and an open state.

Figure 2:
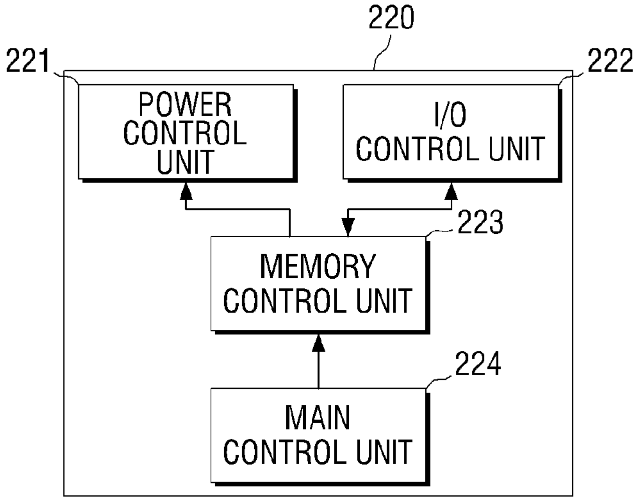
FIG. 2 is a block diagram illustrating an example of composition of a control unit usable in the image forming apparatus of FIG. 1.

FIG. 2 is a block diagram illustrating the control unit 220 usable in the image forming apparatus of FIG. 1. Referring to FIG. 2, the control unit 220 may include a power control unit 221, an I/O control unit 222, a memory control unit 223, and a main control unit 224.

The power control unit 221 controls the power supply unit 210 to provide power to the memory 110 mounted on the consumable unit 100.

The I/O control unit 222 accesses the memory 110 mounted on the consumable unit 100 and performs diverse operations, such as a data reading or a data writing.

The memory control unit 223 controls general operations required to accessing the memory 110. In detail, the memory control unit 223 detects a situation that needs to access the memory 110 mounted on the consumable unit 100 while the image forming apparatus is operating, that is, the memory control unit 223 determines whether any one event of the above described events happens or not. Accordingly, the memory control unit 223 controls the power control part 221 to provide power to the corresponding memory from a time to access the corresponding memory until a time to finish the access. And the memory control unit 223 controls the I/O controlling part 222 to execute a proper process operation during the power supply to the corresponding memory.

The main control unit 224 controls functions (operations) of the image forming apparatus. When a printing command is input with respect to printing data received from a host PC or diverse terminal devices, or printing data stored in a memory built in the image forming apparatus, the main control unit 224 may perform a printing operation according to the printing command. Accordingly, the main control unit 224 controls corresponding consumable units to convert the data suitable to print, to generate a bitmap image, and to print the generated bitmap image on a printing medium.

The main control unit 224 generates a signal to the memory control unit 223 to indicate that an image forming job has been finished. And, the main control unit 224 determines whether at least one of events described above happens, and if an event happens, the main control unit 224 generates a signal to the memory control unit 223 to indicate the event, so that the memory control unit 223 may access the memory mounted on each of the consumable units, that is, access CRUM, at a proper time point.

Although FIG. 2 illustrates the control unit 220 having four elements (four units or four separate semiconductor chips) disposed therein, the control unit 220 may be embodied as an integrated control circuit on a single board, a single semiconductor chip or a semiconductor package. The semiconductor package may be formed with a substrate and one or more semiconductor chips mounted over the substrate.

Figure 3:
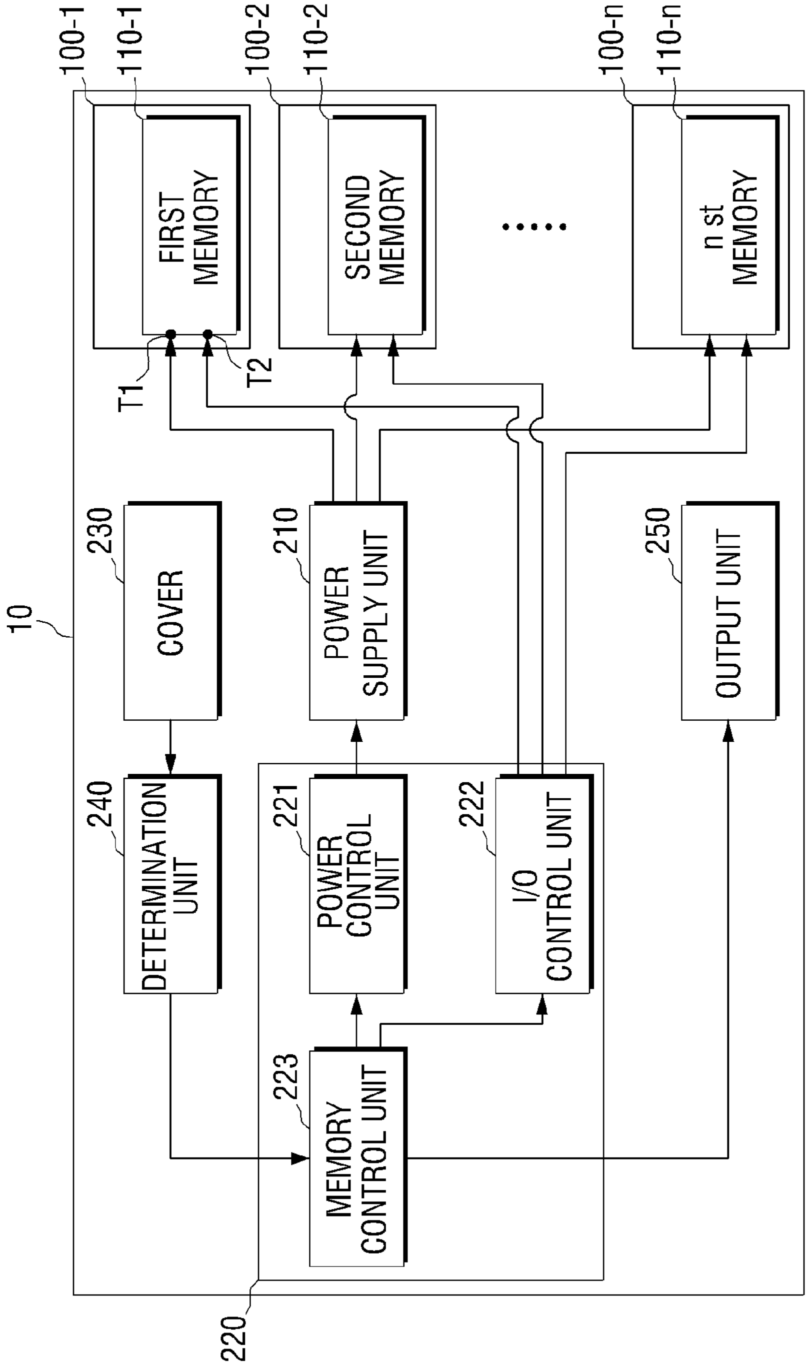
FIG. 3 is a block diagram illustrating an example of a detailed structure provided to explain some exemplary embodiments of the present general inventive concept.

FIG. 3 is a block diagram illustrating an image forming apparatus according to embodiments of the present general inventive concept. Referring to FIG. 3, the image forming apparatus 10 includes a plurality of consumable units 100-1, 100-2, . . . , 100-*n* mounted with corresponding built in memories 110-1, 110-2, . . . , 110-*n*, a power supply unit 210, a control unit 220, a cover 230, a determination unit 240, and an output unit 250.

The control unit 220 includes a power control unit 221, an I/O control unit 222, and a memory control unit 223. Comparing to FIG. 2, the main control unit 224 in the structure of the control unit 220 is not shown. The main control unit 224 may be embodied as a separate chip, or, an embodiment that functions of both the main control unit 224 and the memory control unit 223 in FIG. 2 may be performed by the memory control unit 223 of FIG. 3.

The power supply unit 210 provides power to drive the memories 110-1, 110-2, . . . , 110-*n* prepared in each of a plurality of consumable units 100-1, 100-2, . . . , 100-*n*.

The determination unit 240 determines whether the cover 230 is opened. Electrical contacts or electrode as a sensor or switch may be prepared on a side of the cover 230 or a portion of the main body of the image forming apparatus to detect a closed state or an open state of the cover 230 with respect to the main body or housing of the image forming apparatus. Thus, a voltage of a node connected to the contacts or the electrode may be different according to the closed or open state of the cover 230. The determination unit 240 determines whether the cover 230 is opened or not by sensing the voltage value of the node.

The determination unit 240 provides the determination result to the memory control unit 223. The memory control unit 223 controls the power control unit 221 and the I/O control unit 222 according to the determination result of the determination unit 240 and a determination of the various events. In detail, when an event needs to access the memory 110-1, 110-2, . . . , and 110-*n* mounted on the respective consumable units 100-1, 100-2, . . . , and 100-*n*, the memory control unit 223 controls the power control unit 221 to turn on or activate each of the memories 110-1, 110-2, . . . , and 110-*n*.

The power control unit 221 outputs a driving timing adjust clock with respect to the power supply unit 210 such that power may be provided to the memories 110-1, 110-2, . . . , and 110-*n* sequentially until the access and process regarding each memory have been finished. A wave form of the driving timing adjust clock will be described later in detail.

When the event relates to a group of the consumable units among a plurality of consumable units 100-1, 100-2, . . . , and 100-*n*, the power control unit 21 generates the driving timing adjust clock to supply the power to the group of the consumable units. In this case, the power may not be supplied to the remaining consumable units since the event does not require or the image forming operation does not need to activate the remaining consumable units.

The I/O control unit 222 performs at least one of data reading and data writing with respect to the turn-on memories 110-1, 110-2, . . . , and 110-*n*, sequentially. During this process, information about consumables stored to each of the memories 110-1, 110-2, . . . , and 110-*n* may be updated. The consumables may be stored in the corresponding consumable units 100-1, 100-2, . . . , and 100-*n* to be used in the image forming operation. The consumables may be toner or developer.

Meanwhile, the memory control unit 223 receives information (signal) of whether the cover 230 is opened from the determination unit 240. If the cover 230 is determined to be opened, that is, one or more consumable unit 100-1, 100-2, . . . , and 100-*n* to be in a detachable state, the memory control unit 223 controls the output unit 250 to output an error message.

The output unit 250 may output the an error message in various forms of visual message, voice message, and sound message, as described above, and content of the error message may be set in various ways.

When the cover 230 is opened while the memory is provided with power, the memory control unit 223 controls the power control unit 221 to cut off the power supply immediately.

The memory control unit 223 may keep providing power until a currently performing access or process with respect to the memory is finished, and when the process with respect to the memory that is presently accessing has been finished, the memory control unit 223 may control the power control unit 221 to cut off power supply before accessing a next memory.

The operation of outputting an error message and the operation of cutting off power supply may be performed at the same time. It is possible that the power is cut off after an error message is output. It is also possible that an error message is output after the power is cut off.

The memory control unit 223 may perform an operation with respect to each of the consumable units 100-1, 100-2, . . . , and 100-*n* sequentially and perform processes of cutting off power supply and outputting an error message according to the open and closed state of the cover in every process. For example, a general mono color image forming apparatus has one consumable unit with a built-in CRUM, whereas a multi-color image forming apparatus has about nine consumable units with built-in memories.

When the memory access to one of the consumable units has been finished, the memory control unit 223 determines whether another consumable unit is in a detachable state by checking a cover attached to the another consumable unit, before accessing a memory therein. When the consumable unit is determined to be in detachable state, the memory control unit 223 performs a checking operation on the another consumable unit without performing operations such as an access operation, or a data reading or data writing operation with respect to the corresponding consumable unit. At this time, if the consumable unit becomes non-detachable state by shutting the cover again, the access or data reading or data writing operations with respect to the corresponding consumable unit may be performed.

Thereafter, the main control unit 223 checks whether is any consumable unit that has not been accessed and data reading or data writing operation has not been performed after an operation with respect to the last consumable unit has finished. A process with respect to the consumable unit may resume when the detachable state thereof has been removed (that is, the cover is shut) or the process may be reserved until a next event happens.

When the process resumes, an authentication procedure with respect to the corresponding consumable unit may be performed, because the corresponding consumable unit is returned into a non-detachable state from a detachable state. That is, when a memory access resumes with respect to the memory which has not been accessed, the memory control unit 223 performs a procedure to identify a memory ID of the corresponding memory, and so on, and then, when the procedure is performed successfully, an access operation may be performed. When an access operation of all of the memories is finished, the memory control unit 223 controls the power control unit 221 to cut off power from all of the memories 110-1, 110-2, . . . , and **110-*n***.

Although a single cover 230 is illustrated in FIG. 3, the number and the location thereof are not limited. In other words, processes, such as cutting off power supply and outputting an error message, may be performed in a case that one of a plurality of covers attached to the image forming apparatus is opened.

And, in a case that there are a plurality of covers corresponding to each of consumable units (100-1, 100-2, . . . , **100-*n***), when the cover corresponding to the consumable unit mounted with a memory being presently accessed is in a closed state, and other cover corresponding to other consumable unit is opened, the power supply to the memory may not be cut off, and the memory access may be continued.

The memory control unit 223 may perform the memory access and power supply in various ways, according to the determination result and the time of the determining operation of the determination unit 240.

The memories 110-1, 110-2, . . . , and **110-*n* may have a first terminal T1 to receive the power from the power supply unit 210 of the control unit of the main body and a second terminal T2 to perform a data communication with the I/O control unit of the control unit 220** of the main body.

Figure 4:
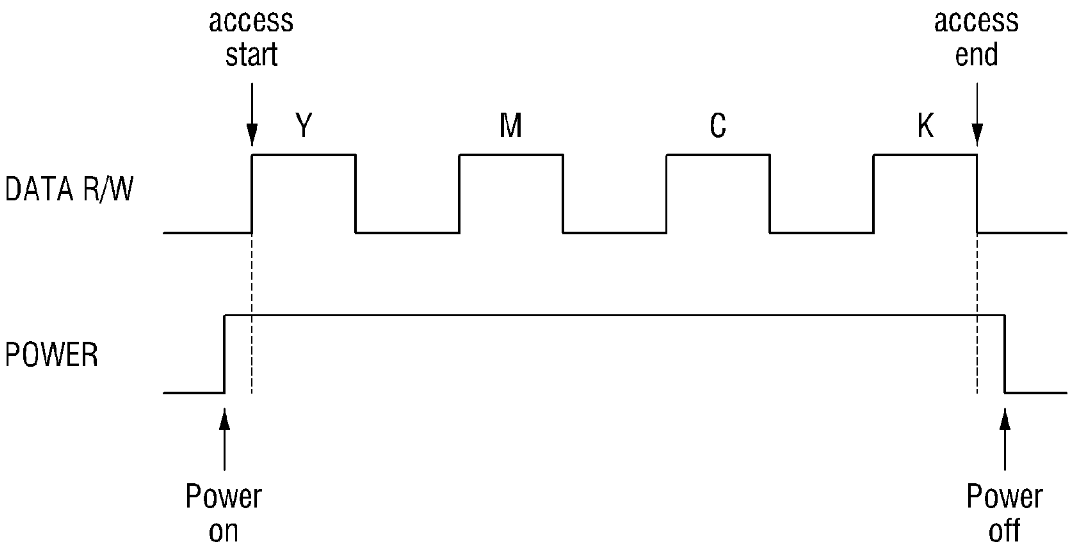
FIGS. 4 through 7 are wave form diagrams illustrating memory access and power supply operations of the image forming apparatus according to exemplary embodiments of the present general inventive concept.

The memories 110-1, 110-2, . . . , and **110-*n* may receive the power supply according to a state of a housing of the consumable units 100-1, 100-2, . . . , 100-*n* which is associated with a state of a corresponding cover 230 of the main body of image forming apparatus FIGS. 4 through 7 are examples of signal waveform diagrams that may be used in the image forming apparatus according to exemplary embodiments of the present general inventive concept. Referring to FIG. 4, Y, M, C, K developer units are used as consumable units 100**.

As illustrated in FIG. 4, the I/O control unit 222 may output a high pulse during an access session (or operation) on each developer unit. The power control unit 221 may output a high pulse during a period corresponding to the access operation, for example, between a access beginning time with respect to a first developer unit, that is, Y developer unit and a access finishing time with respect to a last developer unit, K developer unit. Accordingly, the power supply unit 210 provides power during the period before the access beginning time with respect to the Y developer unit and after the access finishing time with respect to the K developer unit. Thus, the I/O control unit 222 may perform data reading and data writing by accessing each of the developer unit sequentially.

Although a single power supply unit 210 is illustrated in FIGS. 1 and 3, the number of power supply unit 210 may be variable. A plurality of power supply units may be separately provided to be connected to the corresponding memories.

Figure 5:
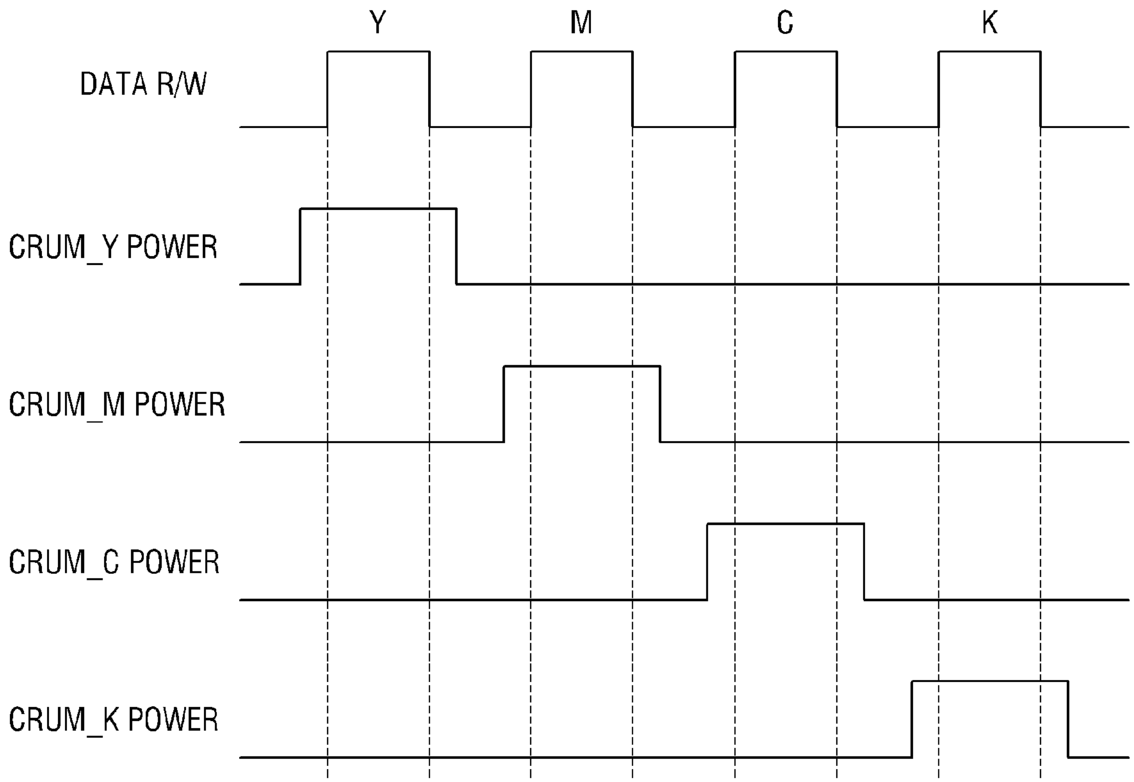

FIG. 5 is a diagram illustrating signal waveforms when a plurality of power supply units are prepared. Referring to FIG. 5, the I/O control unit 222 may output a high pulse during an access operation with respect to each corresponding developer unit. The plurality of power supply units connected to memories mounted on each of the developer unit may provide power (CRUM_Y power, CRUM_M power, CRUM_C power, and CRUM_K power) to each memory during a time including the access operation with respect to a memory corresponding to each of the power supply units.

Meanwhile, when the number of consumable units with built-in memory increases, a single I/O control unit 222 may be used to perform the number of access operation according to the power supply to the corresponding consumable units. However, it is possible that a plurality of I/O control units 222 can be used to correspond to the consumable units.

Figure 6:
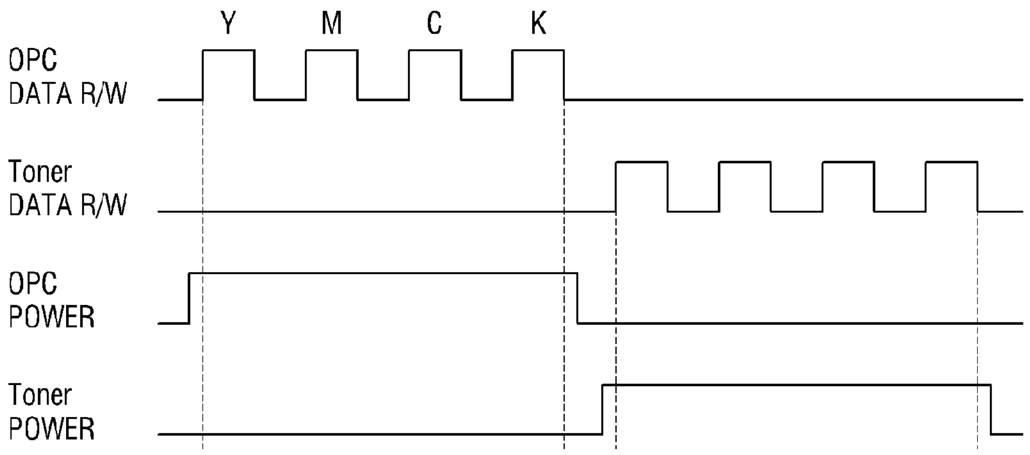

FIG. 6 is a diagram illustrating signal waveforms when two I/O control units are prepared, in a case that four organic photosensitive conductive drums OPCs (or OPC drums) and 4 developer units are embodied as consumable units with built in memory, that is, CRUM units. Referring to FIG. 6, a first I/O signal waveform, that is, OPC DATA R/W is embodied as a pulse form having a high value during an access operation with respect to memories included in each OPC, sequentially.

The power control unit controls the power supply unit to provide power to access a memory of each OPC from a starting time of accessing all of the OPC to a finishing time of the access, then controls the power supply unit to cut off the power, and the control unit controls the power supply unit to provide power to access a memory of each developer from the starting time of accessing following developer units to the finishing time of the access, and then controls the power supply unit to cut off the power. It is possible to use two power control units and two power supply units to perform the OPC DATA R/W operation and the OPC power supply and cut off operation, and the toner DATA R/W operation and the toner power supply or cut off operation, respectively.

Figure 7:
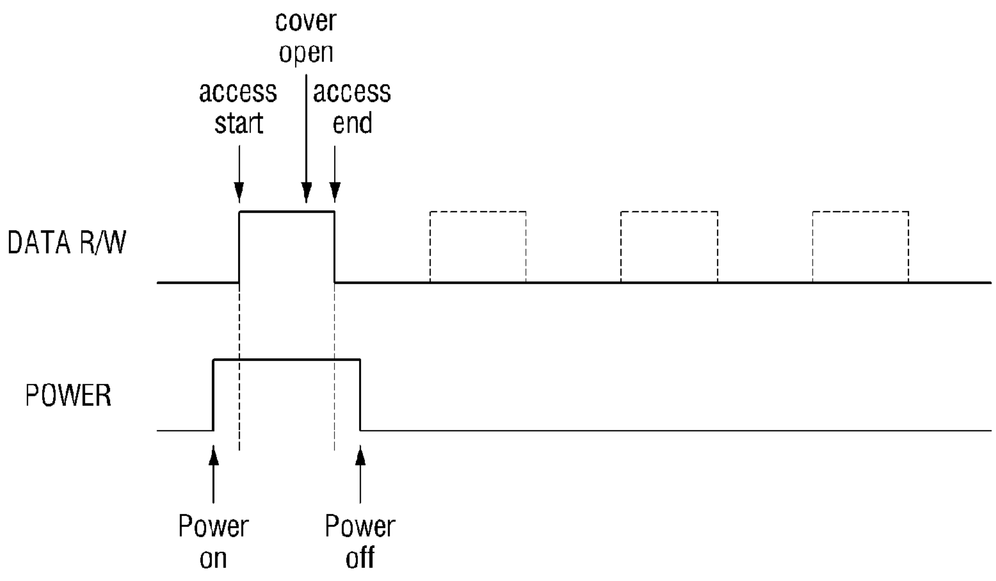

FIG. 7 is a diagram illustrating signal waveforms of an operation performed when the cover is opened while memory accessing with respect to one consumable unit. Referring to FIG. 7, when the cover is open while power is provided to a first developer unit, that is, Y developer unit, and a memory access, for example, DATA R/W operation, is being performed, the power supply continues to be provided until the memory access to the Y developer unit is finished, and thereafter when the memory access is completed, the power supply is cut off. And then, before accessing a memory included in the next M developer unit, it is determined again that the cover is opened or not. When it is determined that the cover is opened, the memory access to the M developer unit is not performed. And before the memory access time with respect to the following C and K developer units, it is determined again that the cover is opened or not such that the memory access thereto may be determined.

Figure 8:
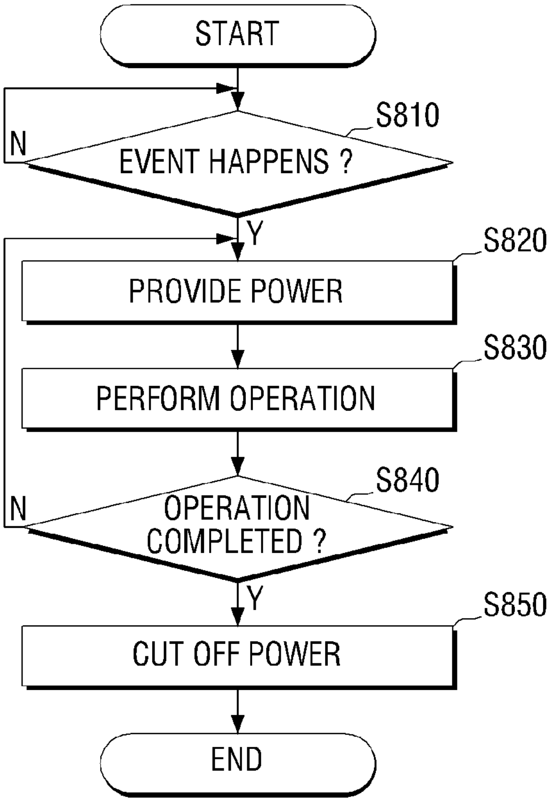
FIGS. 8 and 9 are flow charts illustrating methods of providing power supply according to exemplary embodiments of the present general inventive concept.

FIG. 8 is a flow chart illustrating a method of providing power of an image forming apparatus according to an exemplary embodiment of the present inventive concept. Referring to FIG. 8, it is determined whether an event that needs to access a memory built in the image forming apparatus happens or not at operation S810. Such an event may include an event that a mode of operating the image forming apparatus is changed (for example, change from a power save mode to a normal mode), an event that the image forming apparatus is changed to a turn-on state from a turn-off state, an event that a cover attached to the main body of the image forming apparatus is changed between a closed or open state, an event that executing an image forming job has finished, etc.

When the event happens, power is provided to a memory built in a consumable unit in a main body of the image forming apparatus at operation S820. Accordingly, each memory turns on to perform a communication with the main body of the image forming apparatus.

A control unit included in the main body of the image forming apparatus accesses a corresponding memory to perform an appropriate operation like data reading or data writing at operation S830.

When operation S830 has finished at operation S840, a power supply to the corresponding memory is cut off at operation S850. As such, a power supply to a memory may be performed during a memory access is performed, so that unnecessary power consumption may be prevented. It is possible that the power supply may be performed only during the memory access.

Meanwhile, when there are a plurality of consumable units with built-in memories, the power supply may be cut off after the access and operations on all of the memories have finished.

Figure 9:
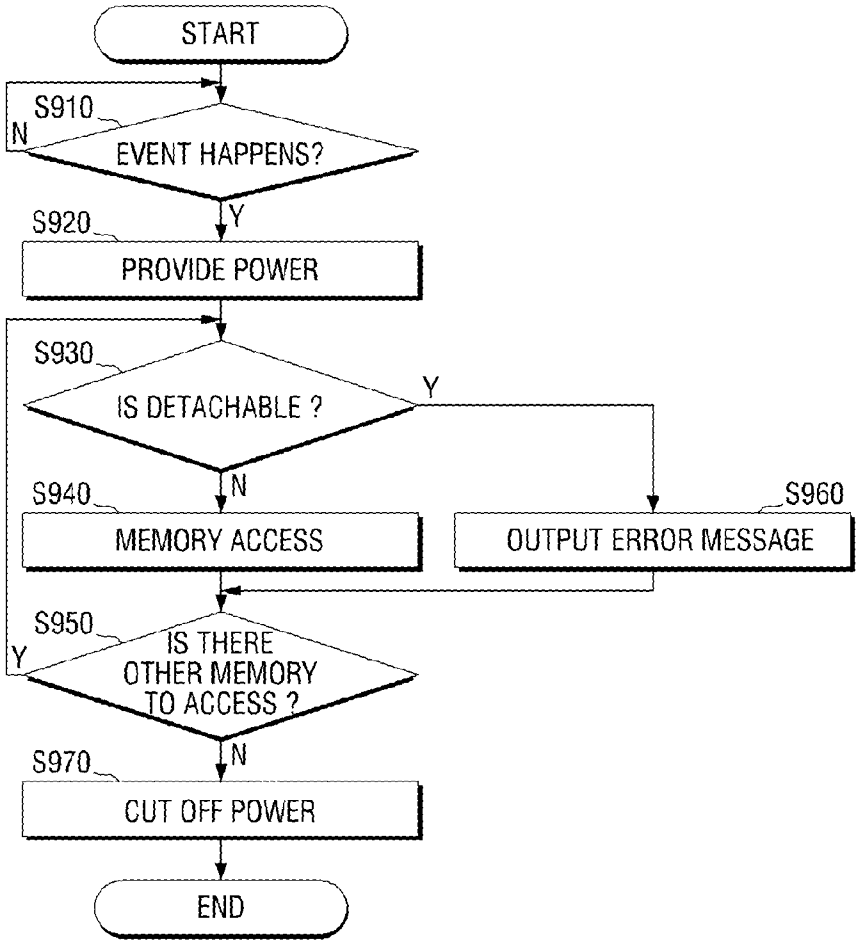

FIG. 9 is a flow chart illustrating a method of providing power of an image forming apparatus according to an exemplary embodiment of the present general inventive concept. Referring to FIG. 9, when an event that needs to access a memory happens at operation S910, power is provided to the memory at operation S920. Examples of the event are as described above, thus, repeated description is omitted here.

At this state, it is determined whether a consumable unit including the memory is detachable or not at operation S930. When the determination is in a non-detachable state, a memory access is allowed and thereafter an operation with respect to the corresponding memory is performed at operation S940.

When the operation with respect to the corresponding memory is finished, it is determined whether there is other memory to access or not at operation S950. If there exists other memory to access, it is determined whether the corresponding memory is detachable at operation S930. Such operations as determining whether to be detachable and a memory access may be performed with respect to all of the memories sequentially.

If there are priorities on the consumable units, the above determination of the detachable state, the power supply, and/or the memory access may be performed on the consumable units according the priorities. That is, the above determination of the detachable state, the power supply, and/or the memory access can be performed on a first consumable unit having a highest priority and then on a second consumable unit having a next lower priority, for example.

Meanwhile, when the consumable unit is determined to be detachable, an error message is output at operation S960. After an error message is output, an operation of cutting off power supply may be performed, although it is not illustrated in FIG. 9. At this time, cutting off the power supply may be performed immediately or at the time when an operation with respect to the memory presently accessing is finished. It is possible that cutting off the power supply may be performed without outputting an error message.

When it is determined that there is no other memory to access at operation S950, a main body in the image forming apparatus cuts off the power supply from the memory at operation S970.

Accordingly, a continued power supply is interrupted to prevent a dangerous situation when a consumable unit is replaced or separated in an unstable state that power is being provided, and also unnecessary power consumption may be prevented.

Meanwhile, the order of operations of the method of FIG. 9 may be changed. In other words, after an event happens, it may be checked whether the consumable unit is detachable before providing power to the memory. Accordingly, if it is determined to be detachable, power may not be provided when the event happened.

If a power supply unit is prepared in every each memory, and whenever accessing a corresponding memory is finished, the power supply to the memory may be cut off.

A memory built in a consumable unit may be referred to as various ways such as a CRUM (Customer Replaceable Unit Monitoring), a memory chip, and a CRUM unit, although it is referred to as a memory in the above described exemplary embodiments.

FIGS. 1 through 3 illustrate only the necessary components to explain exemplary embodiments of the present inventive concept, and other components not illustrated therein may be included in the image forming apparatus. Various components such as various engine units to execute an image forming job, a storage unit to store data, a video control unit to display a message or an image for a scanning or printing operation, a user interface panel to provide a user interface, and a network interface unit to communicate with an external apparatus for the printing operation through a wired or wireless communication may be further included.

Exemplary embodiments of the present inventive concept are described based on the image forming apparatus, but it is not necessarily embodied as the image forming apparatus. In other words, the present general inventive concept may be applied to various types of terminal devices in which a built-in memory is each included and a replaceable unit is used, when accessing each memory is required.

The image forming apparatus using the consumable unit with the built-in memory is described above as an exemplary embodiment of the present general inventive concept. Here, the consumable unit may represent a unit including only a simple memory. However, it is possible that the consumable unit may represent a unit including a CPU as described above. That is, the consumable unit may include the memory which various data or a program is stored thereon and a CPU to control the memory or communicate with the main body of the image forming apparatus. As such, the unit including both a memory and a CPU may be referred to as a CRUM unit (Customer Replaceable Unit Monitoring unit), and more specifically, it may be referred to as an nCRUM unit (New or Next Customer Replaceable Unit Monitoring unit). However, the present general inventive concept is not limited thereto. The consumable unit including a memory and a CPU, which may be referred to as various names, can be used as the consumable unit of the present general inventive concept.

Meanwhile, the memory may store information representing the status according to the use of consumables, for example, printed page counting, dot counting, and the quantity of remaining of the consumables, and diverse unique information of the consumable unit or the image forming apparatus, for example, manufacture information, product information, serial number, and information of an electronic signal information for communication and/or printing operation, for example. The memory may further include an O/S (Operating System) prepared to be used in the consumable unit, separately from the main body of the image forming apparatus. The CPU may perform initialization of the consumable unit itself, separately from initialization of the image forming apparatus, according to the O/S operation. And the CPU may execute authentication between the consumable unit and the main body of the image forming apparatus, when the initialization is completed or while the initialization is performed.

After the authentication is completed, encrypted data communication may be performed between the consumable unit and the main body of the image forming apparatus. At this time, various commands and data received from the main body of the image forming apparatus may be encrypted and transmitted according to a random encryption algorithm.

Figure 10:
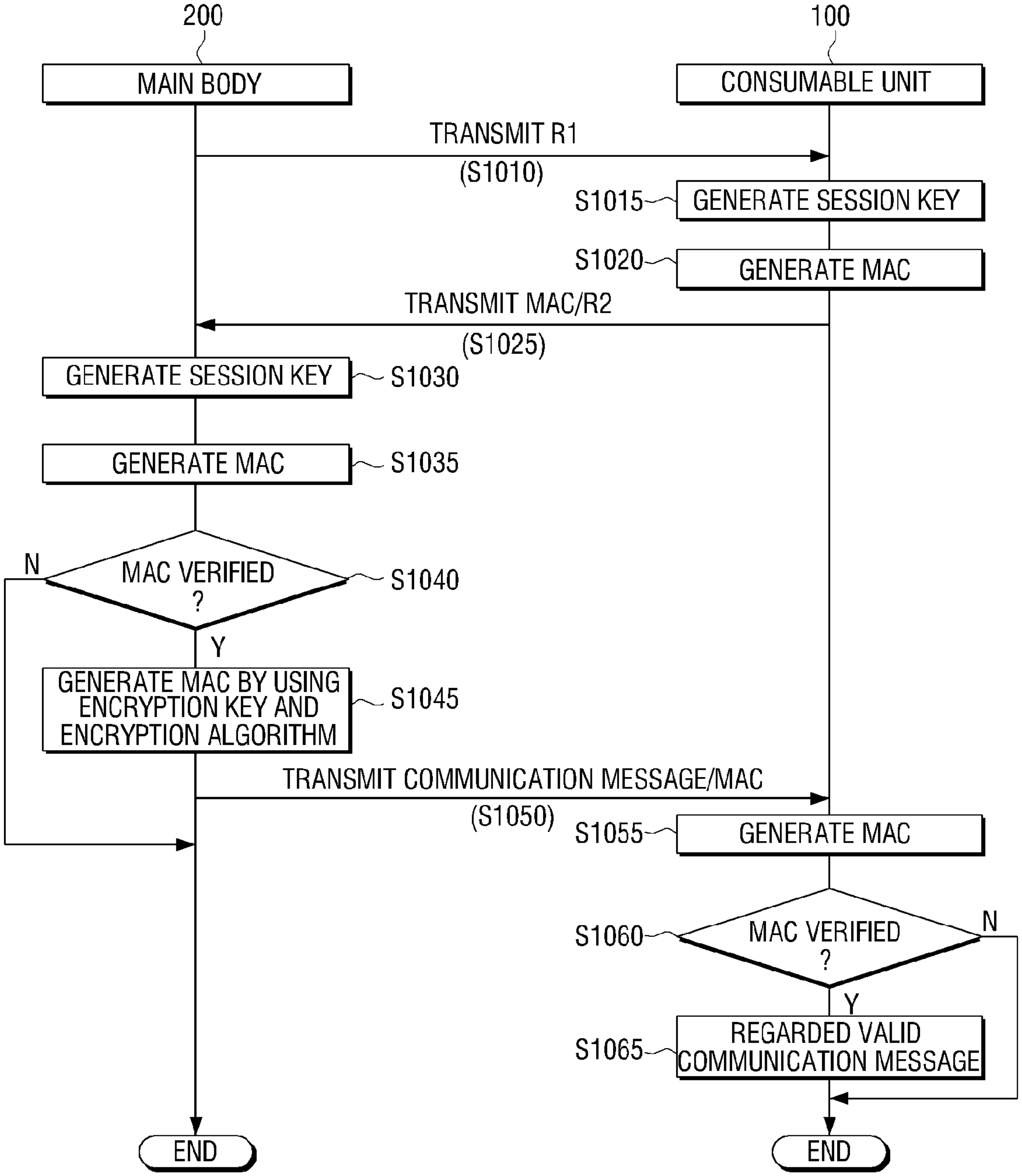
FIG. 10 is a flow chart illustrating a process of authentication and encryption data communication between a consumable unit mounted with a memory coupled to a CPU and a main body of the image forming apparatus according to an embodiment of the present general inventive concept.

FIG. 10 is a flow chart illustrating authentication and encryption data communication between a consumable unit having a CPU and a main body of an image forming apparatus according to an embodiment of the present general inventive concept. Referring to FIG. 10, a main body 200 of an image forming apparatus generates a random value R1 and transmits the same to the consumable unit 100 at operation S1010. Here, R1 may be a value generated randomly or a fixed value was set randomly. When R1 is received, the consumable unit 100 generates a random value R2, generates a session key by using the received R1 and R2 at operation S1015, and generates a MAC (Message Authentication Code) by using the generated session key at operation S1020. Here, the MAC is referred to as MAC1. R2 may also be randomly generated value or a fixed value randomly set like R1.

The consumable unit 100 transmits the generated MAC and R2 to the main body 200. In this case, if there exists unique information such as electronic signal information or product information, the consumable unit may transmit such information together. If such unique information is transmitted, the main body 100 may perform verification with respect to the unique information by comparing stored information in the main body and the received unique information.

The main body 200 generates a session key by combining the received R2 and R1 which was formerly generated at operation S1030, and generates MAC by using the generated session key at operation S1035. Here, the MAC is referred to as MAC2 for convenience of description.

The main body 200 verifies the MAC1 by comparing the generated MAC2 and the received MAC1 at operation S1040. Authentication is completed according to the verification of the MAC. Once authentication is completed, the encryption data communication may be performed thereafter.

For this, the main body 200 of the image forming apparatus and the consumable unit 100 are required to have an identical key and an identical code algorithm, that is, an encryption algorithm. Here, the key may be the session key described above.

When the MAC verification is completed, the image forming apparatus 200 generates a communication message. At this time, a MAC is generated on the data which is expected to be transmitted by using a key and a code algorithm at operation S1045. Here, the MAC is referred to as MAC3 for convenience of description.

And then, the main body 200 transmits the communication message including MAC3 to the consumable unit 100 at operation S1050. The communication message may include a command. That is, the command is encrypted along with the data by the encryption algorithm and the encrypted command and data are transmitted as the communication message.

The consumable unit 100 extracts data from the received communication message and generates a MAC by applying the key and the encryption algorithm at operation S1055. Here, the MAC is referred to as MAC4.

The consumable unit 100 extracts the MAC3 from the received communication message and compares values of the extracted Mac 3 and the self-calculated MC4 for verification at operation S1060.

If the two values are identical to each other in the comparing operation, the communication message may be regarded as being valid, thus an operation corresponding to the communication message may be performed at operation S1065. When they are not identical, the communication message may be regarded as invalid and may be discarded.

As such, when the consumable unit 100 is a CRUM unit having a memory and a CPU, the control unit 220 may provide power to the consumable unit 100 only when a particular event happens.

A preset delay time may be applied to a power cut off operation so that the CPU may complete storing data on a built-in memory. When the control unit 220 accesses the consumable unit 100, the control unit 220 provides power to the consumable unit 100 and then makes power on. When the CPU of the consumable unit 100 is provided with power, the CPU executes initialization. Initialization includes processes such as initial driving of various application programs used on the consumable unit 100, calculating secret information that is required in data communication with the main body 200 of the image forming apparatus after initialization, communication channel setup, memory value initialization, checking its own replace period, setting an internal register value of the consumable unit 100, and setting internal or external clock signals.

The setting the register value represents an operation of setting internal function register values such that the consumable unit 100 may operate to correspond to the functions which was set by a user or an image forming apparatus. And the setting internal and external clock signals represents an operation of adjusting a frequency of an external clock signal provided from the main control unit of the main body 200, that is, the control unit 220 to adjust the internal signal to be usable to the CPU.

Besides, the checking its own replace period represents an operation of informing the control unit 220 of the time when consumables is exhausted by checking the remaining amount of toner or ink in use. Accordingly, if toner is determined to be already exhausted during initialization, it may be embodied that the consumable unit 100 may automatically inform the control unit 220 of an inoperable state, after the initialization. The consumable unit 100 may include a built-in O/S, which is effective in that diverse forms of initialization based on the type and the characteristic of the consumable unit 100 may be performed.

Such the initialization internally performed in the consumable unit 100 may be separate or different from initialization executed in the control unit 220 of the main body of the image forming apparatus.

The control unit 220 may be in a stand-by mode without performing an operation for a predetermined time until initialization finishes after a power supply has begun, that is, for a delay time. When the delay time passes, the control unit 220 may transmit various commands, data and clock signals to the consumable unit 100. Accordingly, an operation, such as data writing or correction, may be performed after a reset and/or an authentication are performed. The consumable unit 100 may be in the stand-by mode to perform an authentication for a predetermined time until the CPU of the consumable unit is ready to perform all functions. At this state, when an Ack (Acknowledgement) signal is received from the consumable unit 100, the main body 200 may perform encryption data communication with the consumable unit 100 by transmitting data to write. The consumable unit 100 and the main body 200 of the image forming apparatus may be connected with each other through the serial interface like I2C, or may be connected through the wireless interface according to an embodiment of the present general inventive concept.

Figure 11:
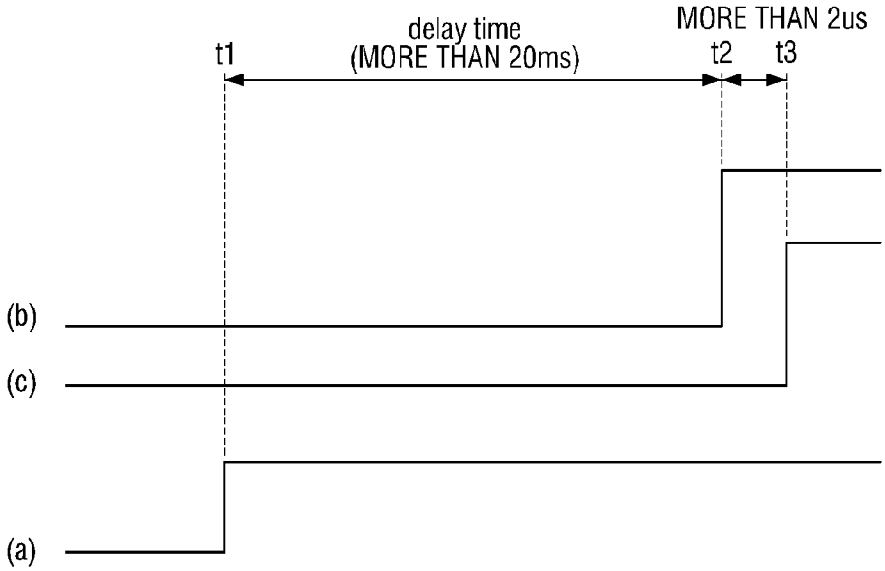
FIGS. 11 and 12 are graphs illustrating a process of managing signals for power-on and power-off of the consumable unit according to an embodiment of the present general inventive concept.

FIG. 11 is a diagram illustrating a power supply timing (a), clock signal (b) and data transmitting timing (c) when the consumable unit 100 is powered on. Referring to FIG. 11, the power supply timing (a) represents a power supply graph, the clock signal (b) represents a clock signal graph, and the data transmitting timing (c) represents a data graph. When power is provided at a time t1 when an event that needs to access a memory of the consumable unit, transmitting the clock signal (b) and data (c) may be performed at a time t2 after a preset delay time (for example, about 20 ms). At this time, as illustrated in clock signal (b) and data (c) of FIG. 11, a delay time of more than 2 μs is provided between the time t2 of transmitting the clock signal and the time t3 of transmitting the data. When the consumable unit and the main body are connected with each other through the I2C interface, a clock signal and data may be transmitted substantially at the same time without a delay time of more than 2 μs, because they are transmitted through separate lines. The delay times, such as 20 ms and 2 μs in FIG. 11, are just examples, and such the delay time may be extended or shortened according to the performance of a CPU or the capacity of a memory.

Meanwhile, when an access to the consumable unit 100 is completed and power is off, transmitting clock signals and data is stopped, and then power is cut off after a predetermined delay time passes. When power is suddenly cut off while the CPU of the consumable unit 100 is writing or changing data on the memory, the CRUM chip or the memory of the consumable unit may be damaged, which results in that incorrect or improper data is written. Thus, power is cut off after a stand-by for the delay time, that is, the time is provided until O/S finishes normally after the CPU performs updating such as writing data normally or changing data.

Figure 12:
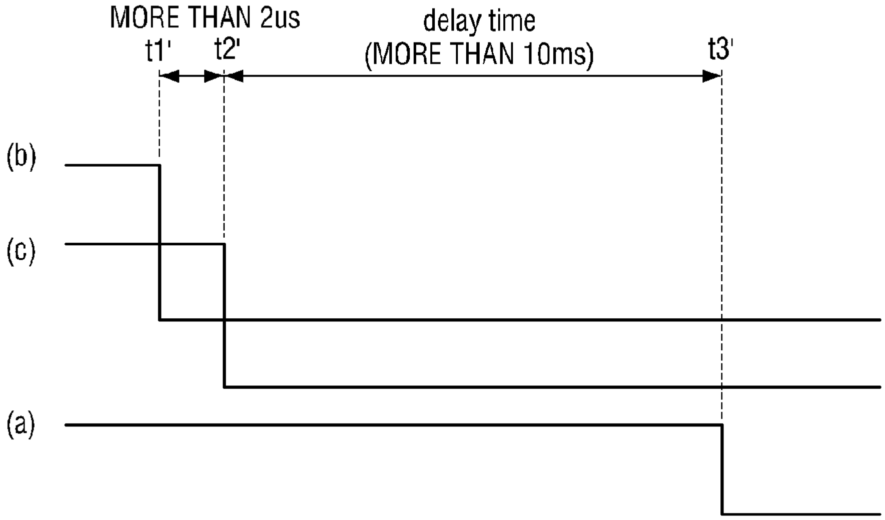

FIG. 12 is a diagram illustrating a power supply timing (a), clock signal (b) and data transmitting timing (c) when the consumable unit 100 is power off. Referring to FIG. 12, the power supply timing (a) represents a power supply graph, the clock signal (b) represents a clock signal graph, and the data transmitting timing (c) represents a data graph. Referring to FIG. 12, when it is necessary to cut off power to the following consumable units due to a memory access having been completed normally or a cover is in an opening state, transmitting clock signal (b) and data (c) is stopped and power is cut off at a time t3' when a predetermined delay time has passed. Referring to FIG. 12, although the delay time is set greater than 10 ms, the present general inventive concept is not limited thereto. The delay time may be extended or shortened. Although there is the delay time of about 2 μs between the time t1 when clock signal transmitting stops and the time t2 when data transmitting stops, this is neither necessarily to be set like the above, and clock signal transmitting and data transmitting may stop almost at the same time according to an embodiment of the present general inventive concept.

As described above, in case that the memory is a CRUM unit mounting both a memory and a CPU, power may be provided and cut off stably, so that dangers such as components damage or data writing error may be prevented.

According to exemplary embodiments of the present inventive concept, the method of providing power supply may be stored to various types of storage mediums and may be embodied as program codes which enable to be executed by the CPU included in the main body of the image forming apparatus.

In detail, the codes to perform the method of providing power supply may be stored to storage mediums which are readable by devices, for example, RAM(Random Access Memory), flash memory, ROM (Read Only Memory), EPROM (Erasable Programmable ROM), EEPROM (Electronically Erasable and Programmable ROM), registers, hard disks, removable disks, memory cards, USB memories, CD-ROMs, and so on.

As described above, exemplary embodiments of the present inventive concept provides the method of providing power supply of the image forming apparatus that includes the consumable unit. The method enables to provide power supply to the consumable unit in effective and safe ways, so that efficiency for using energy may be increased and the possibility of malfunction of the apparatus may be decreased.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:

a consumable unit with a built-in memory;

a power supply unit electrically connected to the consumable unit to provide power to the built-in memory;

a memory control unit to determine whether an event that needs to access the built-in memory happens;

a power control unit to control the power supply unit to provide power to the built-in memory when the event happens;

a cover movably attached to a main body of the image forming apparatus, through which the consumable unit is detachable from the main body;

a determination unit to determine whether the cover is opened or closed;

an outputting unit to output an error message, when the cover is determined to be opened while power is being provided to the built-in memory; and an I/O control unit to perform at least one operation of data reading and data writing on the built-in memory under the control of the memory control unit, when the cover is determined to be closed while power is being provided to the built-in memory, wherein the consumable unit includes a CRUM unit (Customer Replaceable Unit Monitoring unit) comprising a CPU (Central Processing Unit) with the built-in memory; and the power control unit controls the power supply unit to provide power to the CRUM unit when the event happens, transmits a clock signal and data to the CRUM unit after a preset first delay time has passed, when a process in respect to the CRUM unit has finished, stops transmitting the clock signal and the data, and controls the power supply unit to cut off the power from the CRUM unit after a preset second delay time passes.

2. The image forming apparatus of claim 1, wherein:

the consumable unit comprises a plurality of consumable units;

when an operation relating to the built-in memory included in one of the plurality of the consumable units is finished, the memory control unit determines whether there is another built-in memory to access;

when there is another built-in memory to access, the determination unit determines whether the cover corresponding to the consumable unit including the built-in memory is open; and when there is no another built-in memory to access, the power control unit controls the power supply unit to cut off the power.

3. A method of providing a power supply of an image forming apparatus using a consumable unit with a built-in memory in which use information of the consumable unit is stored, the method comprising:

determining whether an event that needs access to the built-in memory happens;

providing power to the built-in memory when it is determined that the event has happened;

determining whether a first cover attached to a main body of the image forming apparatus is opened or closed, through which the consumable unit is detachable from the main body of the image forming apparatus;

displaying an error message if the first cover is opened, and performing at least one operation of data reading and data writing by accessing the built-in memory if the first cover is closed;

determining whether there is another built-in memory to access;

when there is another built-in memory to access, determining whether a second cover corresponding to the another consumable unit in which the another built-in memory is built is opened or closed;

when there exists no another built-in memory to access, cutting off the power, wherein the consumable unit includes a CRUM unit (Customer Replaceable Unit Monitoring unit) comprising a CPU (Central Processing Unit) with the built-in memory; and power is provided to the CRUM unit when the event happens, a clock signal and data is transmitted to the CRUM unit after a preset first delay time has passed, and when a process in respect to the CRUM unit has finished, the clock signal and the data transmission is stopped, and power is cut off from the CRUM unit after a preset second delay time passes.

4. An image forming apparatus comprising:

a consumable unit with a built-in memory;

a power supply unit to provide power to the built-in memory; and a control unit that controls the power supply unit to provide power to the built-in memory when an event that needs access to the built-in memory happens, and the control unit controls the power supply unit to cut off the power to the built-in memory when a process with respect to the built-in memory is finished, wherein the consumable unit includes a CRUM unit (Customer Replaceable Unit Monitoring unit) comprising a CPU (Central Processing Unit) with the built-in memory; and the control unit controls the power supply unit to provide power to the CRUM unit when the event happens, transmits a clock signal and data to the CRUM unit after a preset first delay time has passed, when a process in respect to the CRUM unit has finished, stops transmitting the clock signal and the data, and controls the power supply unit to cut off the power from the CRUM unit after a preset second delay time passes.

5. The image forming apparatus of claim 4, wherein the image forming apparatus further comprises:

a determination unit to determine whether the consumable unit is in a detachable state; and an outputting unit to output an error message under the control of the control-unit, when it is determined that the consumable unit is in the detachable state while power is being provided to the built-in memory.

6. The image forming apparatus of claim 5, wherein the control unit further comprises:

an I/O control unit to perform an operation of data reading or data writing on the built-in memory;

a power control unit to control the power supply unit;

a memory control unit to perform a management on the built-in memory by controlling the I/O control unit and the power control unit; and a main control unit to control a general operation of the image forming apparatus.

7. The image forming apparatus of claim 4, further comprising:

a determination unit to determine whether the consumable unit is in a detachable state, wherein, when it is determined that the consumable unit is in the detachable state while power is being provided to the built-in memory, the control unit controls the power supply unit to cut off the power.

8. The image forming apparatus of claim 7, wherein:

the control unit controls the power supply unit not to provide the power to the built-in memory when the event happens, when the consumable unit is in the detachable state;

the consumable unit comprises a plurality of consumable units; and when the power is being provided to one of the plurality of consumable units and accessing is being performed, and when the one of the plurality of consumable units is determined to be in the detachable state, the control unit controls the power supply unit to cut off the power after a process in respect to the one of the plurality of consumable units has finished.

9. The image forming apparatus of claim 5, wherein the determination unit senses whether a cover movably attached to a main body of the image forming apparatus is open or closed, determines the consumable unit to be in the detachable state when the cover is open, and determines the consumable unit to be in a non-detachable state when the cover is closed.

10. The image forming apparatus of claim 9, wherein:

the consumable unit comprises a plurality of consumable units; and the control unit controls the determination part unit to determine whether each of the plurality of consumable units is in the detachable state, sequentially.

11. The image forming apparatus of claim 9, wherein the event includes at least one of an event that a mode of operating the image forming apparatus is changed, an event that the image forming apparatus is changed between a turn-on state and a turn-off state, an event that the cover attached to the main body of the image forming apparatus is changed between a closed state and an open state, or an event that executing an image forming job has been finished.

12. The image forming apparatus of claim 6, wherein:

the consumable unit comprises a plurality of consumable units;

the I/O control unit outputs an I/O signal clock with respect to the plurality of consumable units to access of the plurality of the consumable units, sequentially; and the power control unit controls the power supply unit to provide the power to each of the plurality of consumable units to access each of the built-in memories of the plurality of consumable units until outputting the I/O signal clock to all each of the plurality of consumable units is finished.

13. The image forming apparatus of claim 6, wherein:

the consumable unit comprises a plurality of consumable units;

the power supply unit comprises a plurality of power supply units, and the plurality of power supply units are connect to the consumable units, respectively;

the I/O control unit outputs an I/O signal clock to the plurality of consumable units to access the built-in memories of the plurality of the consumable units, sequentially; and the power control unit controls the plurality of the power supply units to provide power to the plurality of consumable units to access the built-in memories sequentially during an operation of outputting the I/O signal clock to the consumable unit.

14. A method of providing power of an image forming apparatus mounted with a consumable unit, the method comprising:

providing the power to a memory of the consumable unit when an event that needs to access the memory happens;

performing at least one operation of data reading or data writing by accessing the memory; and cutting off the power provided to the memory when the at least one operation is finished, wherein the consumable unit includes a CRUM unit (Customer Replaceable Unit Monitoring unit) comprising a CPU (Central Processing Unit) with the memory; and power is provided to the CRUM unit when the event happens, a clock signal and data is transmitted to the CRUM unit after a preset first delay time has passed, and when a process in respect to the CRUM unit has finished, the clock signal and the data transmission is stopped, and power is cut off from the CRUM unit after a preset second delay time passes.

15. The method of claim 14, further comprising:

determining whether the consumable unit is in a detachable state while power is being provided to the memory; and outputting an error message if the consumable unit is determined to be in the detachable state.

16. The method of claim 14, further comprising:

determining whether the consumable unit is in a detachable state while power is being provided to the memory; and cutting off the power if the consumable unit is determined to be in the detachable state.

17. The method of claim 14, further comprising:

determining whether the consumable unit is in a detachable state, wherein the cutting off the power comprises, when the consumable unit comprises a plurality of consumable units, and one of the plurality of consumable units is determined to be in the detachable state, while power is being provided to the one of the plurality of consumable units and the accessing is being performed, cutting off the power after a process with respect to the one of the plurality of consumable units is finished.

18. The method of claim 15, wherein the detachable state indicates that a cover movably attached to a main body of the image forming apparatus is opened.

19. The method of claim 18, wherein:

the consumable unit comprises a plurality of consumable units; and the providing the power, the performing the at least one operation, and the cutting off the power are sequentially performed with respect to each of the plurality of consumable units.

20. The method of claim 14, wherein the event includes at least one of an event that a mode of operating the image forming apparatus is changed, an event that the image forming apparatus is changed between a turn-on state and a turn-off state, an event that a cover movably attached to the main body of the image forming apparatus is changed between a closed state and an open state, or an event that executing an image forming job is finished.

21. A consumable unit useable with an image forming apparatus, comprising:

a housing to contain a consumable element; and a memory formed on the housing to store information on the consumable element and to selectively receive power from the image forming apparatus according to an occurrence of an event that needs to access the memory when being installed in the image forming apparatus, wherein the consumable unit includes a CRUM unit (Customer Replaceable Unit Monitoring unit) comprising a CPU (Central Processing Unit) with the memory; and a control unit controls a power supply unit to provide power to the CRUM unit when the event happens, transmits a clock signal and data to the CRUM unit after a preset first delay time has passed, when a process in respect to the CRUM unit has finished, stops transmitting the clock signal and the data, and controls the power supply unit to cut off the power from the CRUM unit after a preset second delay time passes.

22. The consumable unit of claim 21, wherein the memory does not receive the power during a non-data communication with the image forming apparatus.

23. The consumable unit of claim 21, wherein the memory does not receive the power according to a position of the housing which is associated with a state of a cover of the image forming apparatus.

24. The consumable unit of claim 21, wherein:

the memory comprises a first terminal to receive the power supply and a second terminal to receive the data communication from the image forming apparatus; and the memory receives the power through the first terminal for the first predetermined time before the data communication through the second terminal and does not receive the power through the first terminal for the second predetermined time after the data communication through the second terminal.

25. An image forming apparatus comprising:

a consumable unit including a housing to contain a consumable element, and a memory formed on the housing to store information on the consumable element; and a main body to selectively provide power to the consumable unit according to an occurrence of an event that needs to access the memory when being installed in the image forming apparatus to reduce power consumption, wherein the consumable unit includes a CRUM unit (Customer Replaceable Unit Monitoring unit) comprising a CPU (Central Processing Unit) with the memory; and a control unit controls a power supply unit to provide power to the CRUM unit when the event happens, transmits a clock signal and data to the CRUM unit after a preset first delay time has passed, when a process in respect to the CRUM unit has finished, stops transmitting the clock signal and the data, and controls the power supply unit to cut off the power from the CRUM unit after a preset second delay time passes.

26. The image forming apparatus of claim 25, wherein the main body cuts off the power supply to the consumable unit during a non-data communication.

27. The image forming apparatus of claim 25, wherein the main body cuts off the power supply to the consumable unit according to a state of the consumable unit which is associated with a state of a cover of the main body.

28. The image forming apparatus of claim 25, wherein:

the memory comprises a first terminal to receive the power and a second terminal to receive the data communication from the image forming apparatus; and the main body provides the power supply through the first terminal for the first predetermined time before the data communication through the second terminal, provides the power through the first terminal for the second predetermined time after the data communication through the second terminal, and cuts off the power to the consumable unit during a non-data communication between the data communication and a next data communication.

29. The image forming apparatus of claim 25, wherein the main body intermittently provides the power according to a determination on a state of the consumable unit which is associated with a state of the main body.

30. The image forming apparatus of claim 25, wherein the main body repeats an operation of providing the power and cutting off the power according to a state of the main body associated with a state of the consumable unit.

31. The image forming apparatus of claim 25, wherein the consumable unit comprises a plurality of consumable units, and the main body selectively controls supply of the power according to priorities of the plurality of consumable units.

* * * * *

UNITED STATES PATENT AND TRADEMARK OFFICE

CERTIFICATE OF CORRECTION

PATENT NO. : 9,086,679 B2
APPLICATION NO. : 13/233205
DATED : July 21, 2015
INVENTOR(S) : Jae-yoon Lee It is certified that error appears in the above-identified patent and that said Letters Patent is hereby corrected as shown below:

In the Claims

Col. 20, line 58, claim 3, after “which” delete “use”.

Col. 21, line 8, claim 3, after “to” delete “the”.

Col. 21, lines 9-10, claim 3, after “memory” delete “is built”.

Col. 21, lines 50-51, claim 5, after “message,” delete “under the control of the control-unit”.

Col. 22, line 30, claim 10, after “determination” delete “part”.

Col. 22, line 51, claim 12, after “to” delete “all”.

Col. 24, line 22, claim 24, before “and” delete “supply”.

Col. 24, line 50, claim 26, after “power” delete “supply”.

Col. 24, line 53, claim 27, after “power” delete “supply”.

Col. 24, line 60, claim 28, after “power” delete “supply”.

Signed and Sealed this
Twenty-seventh Day of October, 2015

Michelle K. Lee

Michelle K. Lee
*Director of the United States Patent and Trademark Office*